United States Patent
Sozzani

(10) Patent No.: US 11,552,571 B1
(45) Date of Patent: Jan. 10, 2023

(54) RIGHT HALF PLANE ZERO COMPENSATION FOR DC-DC CONVERTER CIRCUITS

(71) Applicant: Dialog Semiconductor (UK) Limited, London (GB)

(72) Inventor: Alberto Sozzani, Munich (DE)

(73) Assignee: Dialog Semiconductor (UK) Limited, London (GB)

(*) Notice: Subject to any disclaimer, the term of this patent is extended or adjusted under 35 U.S.C. 154(b) by 3 days.

(21) Appl. No.: 16/987,772

(22) Filed: Aug. 7, 2020

(51) Int. Cl.
*H02M 3/335* (2006.01)
*H02M 1/00* (2006.01)

(52) U.S. Cl.
CPC ......... *H02M 3/33553* (2013.01); *H02M 1/00* (2013.01); *H02M 1/0009* (2021.05)

(58) Field of Classification Search
CPC ............... H02M 3/33553; H02M 1/00; H02M 1/0009
USPC ................................................ 363/282, 21.04
See application file for complete search history.

(56) References Cited

U.S. PATENT DOCUMENTS

| | | | | |
|---|---|---|---|---|
| 9,362,828 B2* | 6/2016 | Peker | ................... | H02M 3/1582 |
| 2010/0320992 A1* | 12/2010 | Dearn | ................. | H02M 3/1582 |
| | | | | 323/311 |
| 2011/0199062 A1* | 8/2011 | Singnurkar | ......... | H02M 3/1582 |
| | | | | 323/282 |
| 2014/0217996 A1* | 8/2014 | Peker | ................... | H02M 3/1582 |
| | | | | 323/271 |
| 2016/0156268 A1* | 6/2016 | Thomas | ................ | H02M 3/158 |
| | | | | 323/271 |
| 2016/0233768 A1* | 8/2016 | de Cremoux | ....... | H02M 3/1588 |
| 2018/0262106 A1* | 9/2018 | Chakkirala | ........... | H02M 3/158 |
| 2020/0235667 A1* | 7/2020 | Padure | ................ | H02M 3/1582 |

* cited by examiner

*Primary Examiner* — Yemane Mehari
(74) *Attorney, Agent, or Firm* — Saile Ackerman LLC; Stephen B. Ackerman

(57) ABSTRACT

The present document relates to a power converter configured to convert an input voltage at an input of the power converter into an output voltage at an output of the power converter. The power converter may comprise a power stage, a voltage controlled voltage source VCVS, a first feedback path and a second feedback path. The power stage may be coupled to the output of the power converter. The VCVS may be configured to generate, at an output of the VCVS, an error voltage by comparing a reference voltage with a feedback voltage indicative of the output voltage. The first feedback path may extend from the output of the power converter, via the VCVS, via the power stage, to the output of the power converter. The second feedback path may extend from the output of the VCVS to the output of the power converter.

30 Claims, 16 Drawing Sheets

RIGHT HALF PLANE ZERO COMPENSATION FOR DC-DC CONVERTER CIRCUITS

TECHNICAL FIELD

The present document relates to DC (Direct Current)/DC converters. In particular, the present document relates to new feedback schemes in DC/DC converters with improved control loop performance. Even more specifically, the field of the invention comprises the compensation of DC/DC converters which have a Right Half Plane Zero (RHPZ) in their transfer function, like boost, buck-boost and inverting buck-boost converters.

BACKGROUND

In literature, the RHPZ in DC/DC converters is seen as a fundamental limitation of the converter itself. Usually, it is not possible to compensate the RHPZ and the only thing that can be done is limiting the Unity Gain Frequency (UGF) of the gain loop (Gloop) transfer function to frequencies much lower than the RHPZ, in order to have the required phase margin. Doing this, the converter is slow and transient performances are poor. For example, the output voltage may suddenly increase or decrease after a load transient, or the Power Supply Rejection Ratio (PSRR) of the converter may be substantially deteriorated.

In general, the RHPZ frequency may be related to the coil value, the output voltage Vout, and the output current Iout, and may be a frequency much lower than the possible UGF of the same converter, in the same conditions, but without the RHPZ.

SUMMARY

This invention makes it possible to remove the RHPZ from the Gloop transfer function, and the Gloop UGF may be pushed to values higher than the RHPZ frequency if needed, greatly improving the transient performances of the DC/DC converter.

The invention can be applied to boost, buck-boost and inverting buck-boost converters, that have the RHPZ in the Gloop, but also to buck converters to improve load transient behavior.

According to an aspect, a boost power converter is presented. The boost power converter may be configured to convert an input voltage at an input of the boost power converter into an output voltage at an output of the boost power converter. The boost power converter may comprise a power stage, a voltage controlled voltage source VCVS, a first feedback path and a second feedback path. The power stage may be coupled to the output of the boost power converter. The VCVS may be configured to generate, at an output of the VCVS, an error voltage by comparing a reference voltage with a feedback voltage indicative of the output voltage. The first feedback path may extend from the output of the boost power converter, via the VCVS, via the power stage, to the output of the boost power converter. The second feedback path may extend from the output of the VCVS to the output of the boost power converter. In particular, the second feedback path may be arranged directly between the output of the VCVS and the output of the boost power converter. The second feedback path may be configured to remove or compensate a Right Half Plane Zero (RHPZ) of the transfer function of the boost power converter. Specifically, the second feedback path may be configured to move the RHPZ to higher frequencies or to change it into a Left Half Plane Zero (LHPZ).

In the boost power converter, the output voltage may be equal to or larger than the input voltage, whereas an output current may be equal to or smaller than an input current. The first feedback path may further comprise a resistive divider configured to generate the feedback voltage based on the output voltage. For instance, the VCVS may be configured to subtract the feedback voltage from the reference voltage, thereby creating a negative feedback loop. At the same time, the VCVS may be configured to amplify a difference between the feedback voltage and the reference voltage.

The second feedback path may be different from the first feedback path in a sense that the second feedback path may not overlap with the first feedback path. More specifically, the second feedback path may not comprise the power stage. In other words, the second feedback path may directly couple the output of the VCVS to the output of the boost power converter.

The second feedback path may comprise a high pass filter. The second feedback path may be regarded as a high frequency feedback path. The second feedback path may comprise a resistive element and a capacitive element. Further, the second feedback path may comprise a buffer circuit coupled in series with the resistive element and the capacitive element. The buffer circuit (also denoted as buffer amplifier) may be a voltage buffer such as e.g. a voltage follower.

The VCVS may comprise an error amplifier. Alternatively or additionally, the VCVS may comprise a voltage controlled current source VCCS configured to generate an error current by comparing the feedback voltage with the reference voltage. The VCVS may comprise a first resistor configured to translate the error current into said error voltage. The second feedback path may comprise a single resistive element coupled to said error current. For example, the VCCS may be an operational transconductance amplifier (OTA).

The boost power converter may further comprise an inductive element coupled between the input of the boost power converter and the power stage. The boost power converter may further comprise a comparator configured to generate a duty cycle signal by comparing the error voltage with a voltage indicative of a current through the inductive element. Moreover, the boost power converter may comprise a second resistor for translating a current indicative of the current through the inductive element into the voltage indicative of the current through the inductive element. In addition, the boost power converter may further comprise a current sensing circuit configured to sense a current through the inductive element.

In general, the comparator may be configured to generate the duty cycle signal by comparing the error voltage with a saw-tooth signal which is generated by a ramp generator circuit (voltage mode converter) or the saw-tooth signal which is generated by the ramp generator circuit summed with the voltage indicative of the current through the inductive element (current mode converter).

The boost power converter may further comprise a third feedback path from the current sensing circuit, via the comparator, via the power stage, to the output of the boost power converter. The first and the third feedback path may interfere with each other. To be more specific, the first feedback path may be regarded as the outer (voltage) feedback loop and the third feedback path may be regarded as the inner (current) feedback loop of a feedback mechanism which depends on both a current through the inductive element and the output voltage.

The power stage may further comprise a high-side switching element coupled between a switching node of the power stage and the output of the boost power converter. The power stage may further comprise a low-side switching element coupled between the switching node and a reference potential. For example, the switching node may be connected to an output terminal of the inductive element.

Throughout this document, the term "reference potential" is meant in its broadest possible sense. In particular, the reference potential is not limited to ground i.e. a reference potential with a direct physical connection to earth. Rather, the term "reference potential" may refer to any reference point to which and from which electrical currents may flow or from which voltages may be measured. Moreover, it should be mentioned that the reference potentials mentioned in this document may not necessarily refer to the same physical contact. Instead, the reference potentials mentioned in this document may be related to different physical contacts although reference is made to "the" reference potential for ease of presentation.

The power stage may sometimes also be denoted as half-bridge. The high-side switching element and the low-side switching element (sometimes also denoted as pass devices) may be implemented with any suitable device, such as, for example, a metal-oxide-semiconductor field effect transistor MOSFET, an insulated-gate bipolar transistor IGBT, a MOS-gated thyristor, or any other suitable power device. Each switching element may have a gate to which a respective driving voltage or control signal may be applied to turn the switching element on (i.e. to close the switching element) or to turn the switching element off (i.e. to open the switching element).

According to another aspect, a buck power converter is presented. The buck power converter may be configured to convert an input voltage at an input of the buck power converter into an output voltage at an output of the buck power converter. The buck power converter may comprise a power stage coupled to the input of the buck power converter. The buck power converter may comprise a voltage controlled voltage source VCVS configured to generate, at an output of the VCVS, an error voltage by comparing a reference voltage with a feedback voltage indicative of the output voltage. The buck power converter may comprise a first feedback path from the output of the buck power converter, via the VCVS, via the power stage, to the output of the buck power converter. The buck power converter may comprise a second feedback path from the output of the VCVS to the output of the buck power converter.

In the buck power converter, the output voltage may be equal to or smaller than the input voltage, whereas an output current may be equal to or larger than an input current. The second feedback path may not comprise the power stage. The second feedback path may comprise a high pass filter.

The VCVS may comprise a voltage controlled current source VCCS configured to generate an error current by comparing the feedback voltage with the reference voltage, and a first resistor configured to translate the error current into said error voltage. The second feedback path may only comprise a single resistive element coupled to the error current.

The buck power converter may further comprise an inductive element coupled between the power stage and the output of the buck power converter. The buck power converter may further comprise a comparator configured to generate a duty cycle signal by comparing the error voltage with a saw-tooth signal only (voltage mode converter) or a saw-tooth signal summed with a voltage indicative of a current through the inductive element (current mode converter).

The buck power converter may further comprise a high-side switching element coupled between a switching node of the power stage and the input of the buck power converter. The buck power converter may further comprise a low-side switching element coupled between the switching node and a reference potential. For example, the switching node may be connected to an input terminal of the inductive element.

According to another aspect, a method of operating a boost power converter is described. The method may comprise steps which correspond to the functional features of the boost power converter described in the present document. The boost power converter may convert an input voltage at an input of the boost power converter into an output voltage at an output of the boost power converter. The method may comprise coupling a power stage to the output of the boost power converter. The method may comprise generating, by a voltage controlled voltage source VCVS, at an output of the VCVS, an error voltage by comparing a reference voltage with a feedback voltage indicative of the output voltage. The method may comprise establishing a first feedback path from the output of the boost power converter, via the VCVS, via the power stage, to the output of the boost power converter. The method may comprise establishing a second feedback path from the output of the VCVS to the output of the boost power converter.

Again, the second feedback path may not comprise the power stage. The second feedback path may comprise a high pass filter. For example, the second feedback path may comprise a resistive element and a capacitive element. The second feedback path may comprise a buffer circuit coupled in series with the resistive element and the capacitive element.

The VCVS may comprise an error amplifier. Alternatively or additionally, the VCVS may comprise a voltage controlled current source VCCS and a first resistor. The method may comprise generating, by the VCCS, an error current by comparing the feedback voltage with the reference voltage. The method may comprise translating, by the first resistor, the error current into said error voltage. The second feedback path may (only) comprise a single resistive element coupled to said error current.

The method may comprise coupling an inductive element between the input of the boost power converter and the power stage. The method may comprise generating, by a comparator, a duty cycle signal by comparing the error voltage with a voltage indicative of a current through the inductive element. Optionally, the method may comprise sensing, by a current sensing circuit, a current through the inductive element.

The method may comprise establishing a third feedback path from the current sensing circuit, via the comparator, via the power stage, to the output of the boost power converter. The method may comprise coupling a high-side switching element between a switching node of the power stage and the output of the boost power converter. The method may comprise coupling a low-side switching element between the switching node and a reference potential.

According to another aspect, a method of operating a buck power converter is described. The method may comprise steps which correspond to the functional features of the buck power converter described in the present document. The buck power converter may convert an input voltage at an input of the buck power converter into an output voltage at an output of the buck power converter. The method may comprise coupling a power stage to the input of the buck power converter. The method may comprise generating, by a voltage controlled voltage source VCVS, at an output of the VCVS, an error voltage by comparing a reference voltage with a feedback voltage indicative of the output voltage. The method may comprise establishing, a first feedback path from the output of the buck power converter, via the VCVS, via the power stage, to the output of the buck power converter. The method may comprise establishing, a second feedback path from the output of the VCVS to the output of the buck power converter.

The second feedback path may not comprise the power stage. The second feedback path may comprise a high pass filter.

The method may comprise generating, by a voltage controlled current source VCCS, an error current by comparing the feedback voltage with the reference voltage. The method may comprise translating, by a first resistor, the error current into said error voltage. The method may comprise coupling a single resistive element of the second feedback path to said error current.

The method may comprise coupling an inductive element between the power stage and the output of the buck power converter. The method may comprise generating, by a comparator, a duty cycle signal by comparing the error voltage with a saw-tooth signal only (voltage mode converter) or a saw-tooth signal summed with a voltage indicative of a current through the inductive element (current mode converter). Furthermore, the method may comprise coupling a high-side switching element between a switching node of the power stage and the input of the buck power converter. The method may comprise coupling a low-side switching element between the switching node and a reference potential.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which.

DETAILED DESCRIPTION

An exemplary implementation of the invention is shown, giving an intuitive explanation about how the RHPZ compensation works (see section "Step 1: practical implementation"). The right half plane zero is a physical effect that can be seen in practical circuits. It is correctly explained and predicted in the Gloop transfer function by the small signal model of DC/DC converters. Thus, to understand the RHPZ compensation of this invention, there is a need to be able to build step by step the Gloop transfer function (see section "Step 2: the Gloop transfer function") and then understand where the RHPZ comes from in the Gloop itself (see section "Step 3: the RHPZ"). Having done this, it will be shown that the proposed invention is a way to compensate for the RHPZ (see section "Step 4: compensation of the RHPZ").

Figure 1:
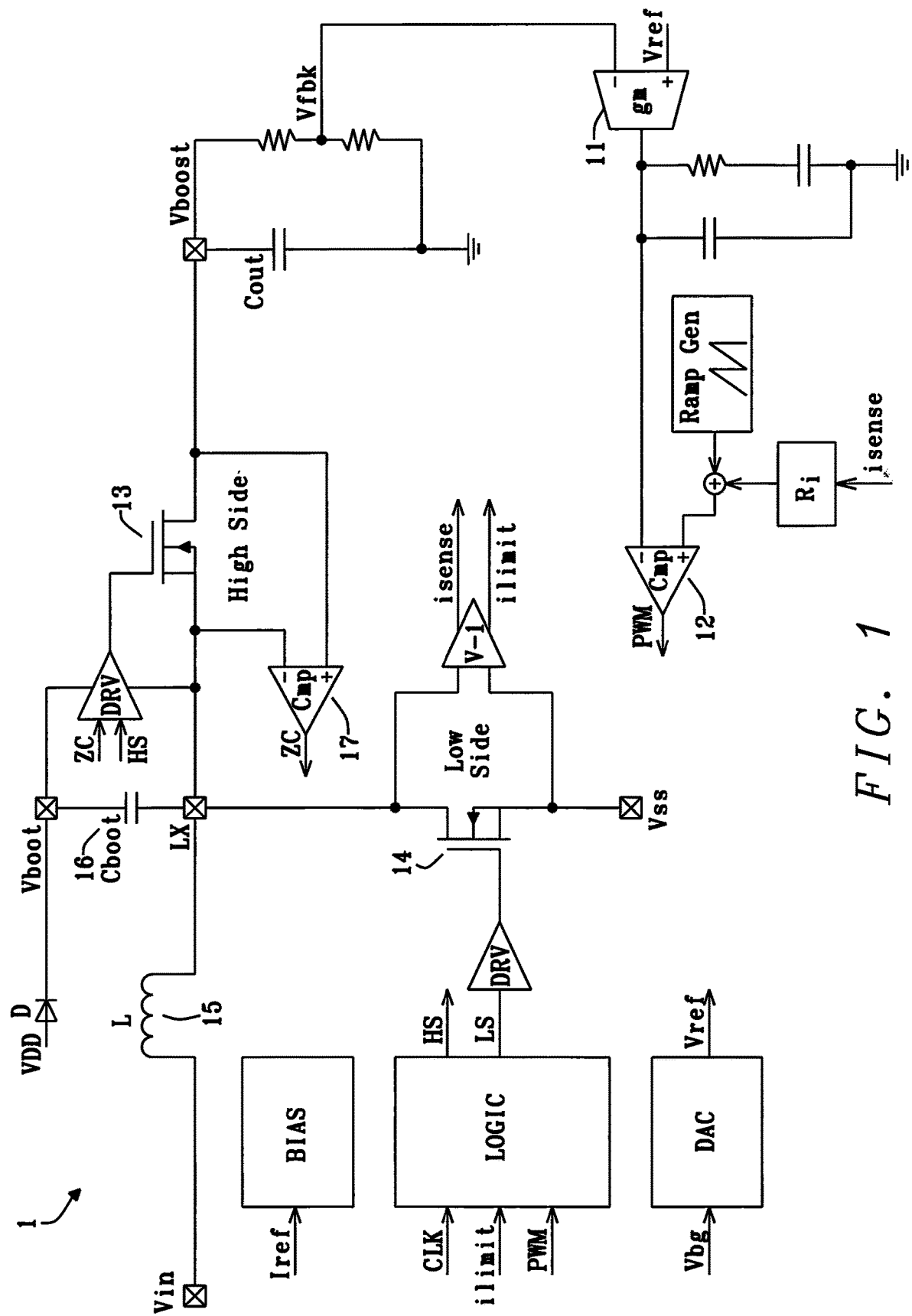
FIG. 1 shows an exemplary boost switching converter working in pulse width modulation.

FIG. 1 shows an exemplary boost switching converter 1 working in pulse width modulation (PWM). The output voltage is read using a resistive divider to generate a feedback voltage Vfbk that is compared to a reference voltage Vref. Vref is generated from a Digital-to-analog Converter (DAC) to be programmable, and it starts from a bandgap voltage reference to be temperature-compensated.

We compare the feedback with the reference using an operational transconductance amplifier (OTA) 11 called gm. The OTA 11 may be regarded as a voltage controlled current source VCCS configured to generate an error current based on a difference between the feedback voltage Vfbk and the reference voltage Vref. The transfer function of this block is shaped using a compensation network at the output of the OTA 11 to generate the error voltage Verror that is compared with the sum of the ramp and the coil current information coming from a current sense circuit. The output of comparator 12 is the PWM signal (duty signal) that drives the turn on and off of the high side switch 13 and low side switch 14, creating the desired square wave at the switching node LX, where the coil 15 is connected. In this way, a regulated output voltage Vboost is generated that is higher than the input voltage Vin. Given that the high side switch 13 may be an n-type metal-oxide-semiconductor (NMOS), a bootstrap capacitor 16 may be needed to supply the driver of the high side switch when the switching node LX is high. To implement a diode emulation, the current in the high side switch needs to stop when it reaches zero. To do this, the zero cross comparator 17 connected across the high side switch 13 is used.

In general, the boost switching converter 1 described within this document may further comprise an output capacitor coupled between the output of the boost switching converter 1 and a reference potential. The coil 15, the bootstrap capacitor 16, and said output capacitor may be external components i.e. external to the boost switching converter 1 of FIG. 1. Moreover, the voltages Vboot, Vss, and the output voltage Vboost may be associated with external nets. The high side switch 13 and the low side switch 14 may be both power devices configured to operate in commutation mode (i.e., they are either turned on or off) and are usually not used in linear operation.

Step 1: Practical Implementation

Figure 2:
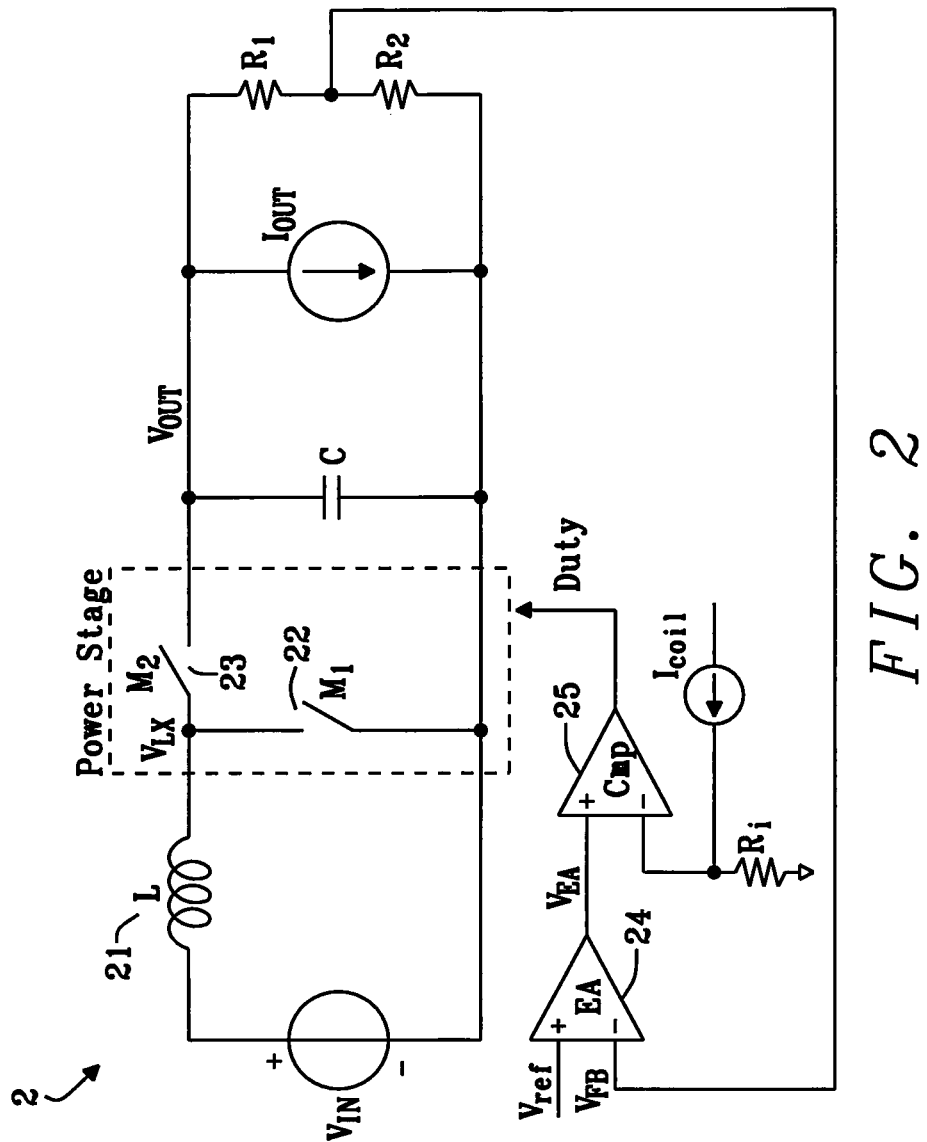
FIG. 2 shows another exemplary boost switching converter.

Let us take as an example a standard current mode boost converter 2 as depicted in FIG. 2. A coil L 21 is connected to a voltage source Vin on one side and to the switches M1 22 and M2 23 on the other side. The coil 21 is charged by the voltage Vin when M1 is closed and is discharged by the voltage (Vout-Vin) when M2 is closed. The two switches create a square wave VLX from ground to Vout on one side of the inductor with a mean value equal to Vin (i.e. the voltage applied by the voltage source on the other side of the inductor) when the circuit is in a steady state condition.

To control the output voltage Vout, the circuit senses the Vout with the resistive divider R1 and R2 generating the feedback signal $V_{FB}$, that is compared with the desired reference $V_{ref}$ by the error amplifier circuit EA 24. The output of the circuit $V_{EA}$ is the error ($V_{FB}$-$V_{ref}$) amplified by the error amplifier gain EA (that is also inverting the signal to create the negative feedback loop). This error voltage $V_{EA}$ is then compared with the coil current (converted into voltage by the resistor $R_i$) by the comparator Cmp 25 that generates the duty signal that turns on and off the two switches M1 22 and M2 23. When in steady state, the output of the error amplifier 24 can be seen as a constant signal. On the other hand, the coil current has a sawtooth shape, so the output of the comparator Cmp 25 is a square wave between ground and the supply of the comparator. The information brought by this signal is the duty cycle of the waveform itself (i.e. on-time divided by the period). During the on-time, the switch M1 is closed. During the off-time, the switch M2 is closed. If we call D the duty cycle, then Vout=Vin/(1-D), the quantity (1-D) is also called D'.

Figure 3:
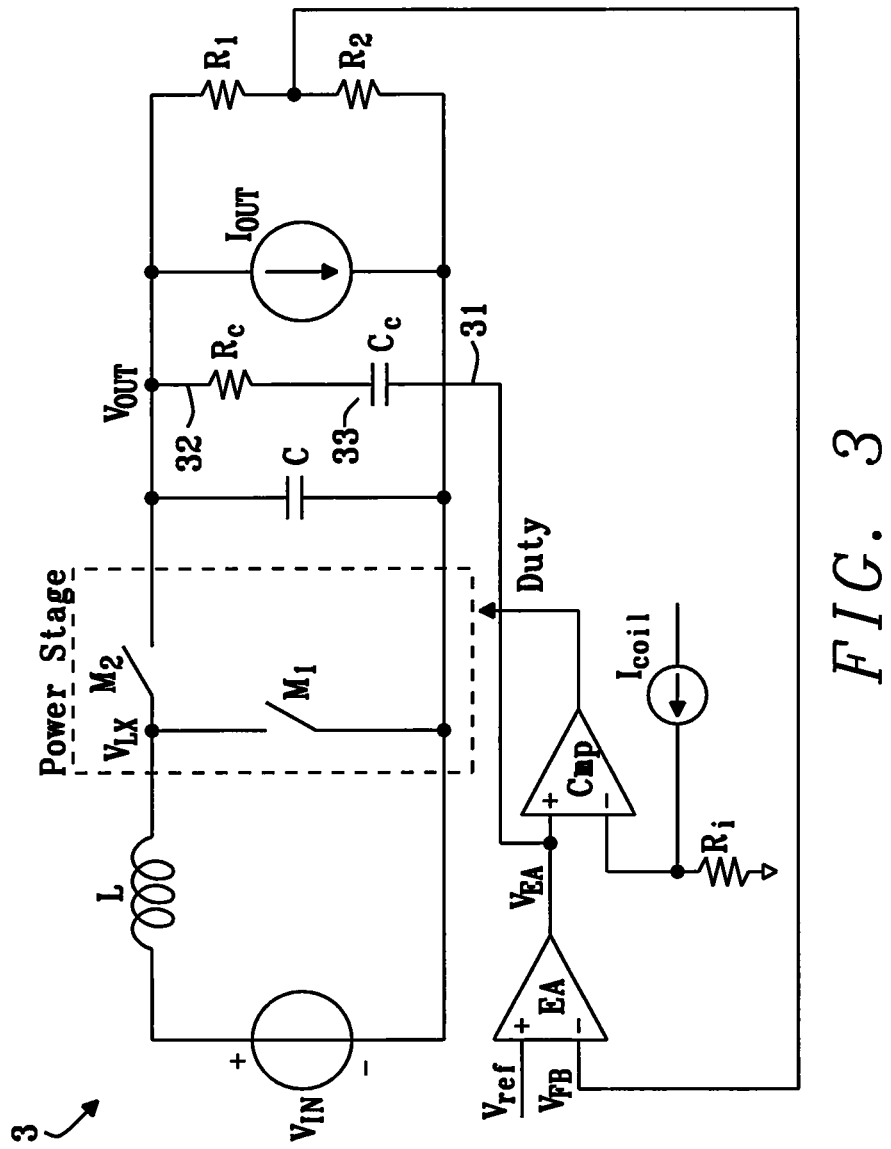
FIG. 3 shows an exemplary boost converter with a high-frequency path.

A new feedback scheme that can be applied to the circuits of FIG. 1 and FIG. 2 can be seen in FIG. 3. The power converter 3 in FIG. 3 has a high-frequency path 31 from the output of the error amplifier $V_{EA}$ to $V_{out}$. A simple implementation for the high-frequency path can be as simple as a resistive element Rc 32 in series with a capacitive element Cc 33.

An intuitive explanation is the following: the physical effect of the RHPZ is that if the circuit at the input of the power stage is open, and a step up is applied, the ideal response of the feedback circuit (EA and Cmp) should be to decrease the Duty signal to keep the $V_{out}$ constant. Instead, due to the RHPZ the initial response goes into the direction to further increase the duty cycle, and the output voltage Vout, and only after some time to decrease the duty cycle. During this period, the output voltage goes in the opposite direction with respect to the ideal behavior and is more like a positive feedback that leads to instability. With the new high-frequency path, a signal is generated that goes in the right direction, compensating the unwanted behavior of the circuit due to the RHPZ. For example, with a step up at the input of the power stage, the output voltage $V_{out}$ would go high, the output of the error amplifier would go down, and through the high-frequency path the proposed circuit would try to bring down the output, improving the stability. The standard path through the comparator Cmp and the power stage would try to initially further increase the $V_{out}$ but after a while the $V_{out}$ will go in the correct direction, trying to recover $V_{out}$. The new high-frequency path will not interfere with the low-frequency behavior of the loop because it has no gain at low frequencies.

Figure 4:
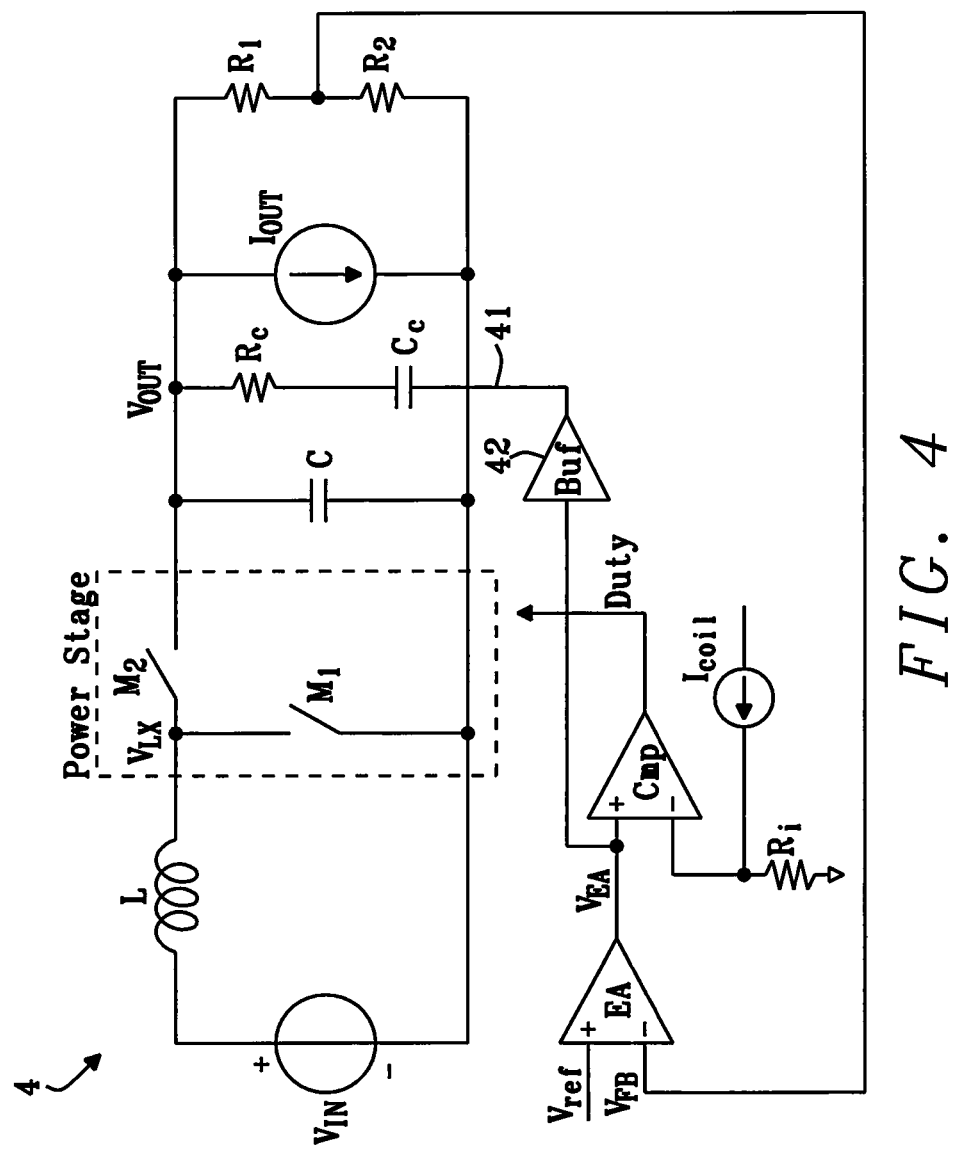
FIG. 4 shows an exemplary boost converter with an alternative high-frequency path.
Figure 5:
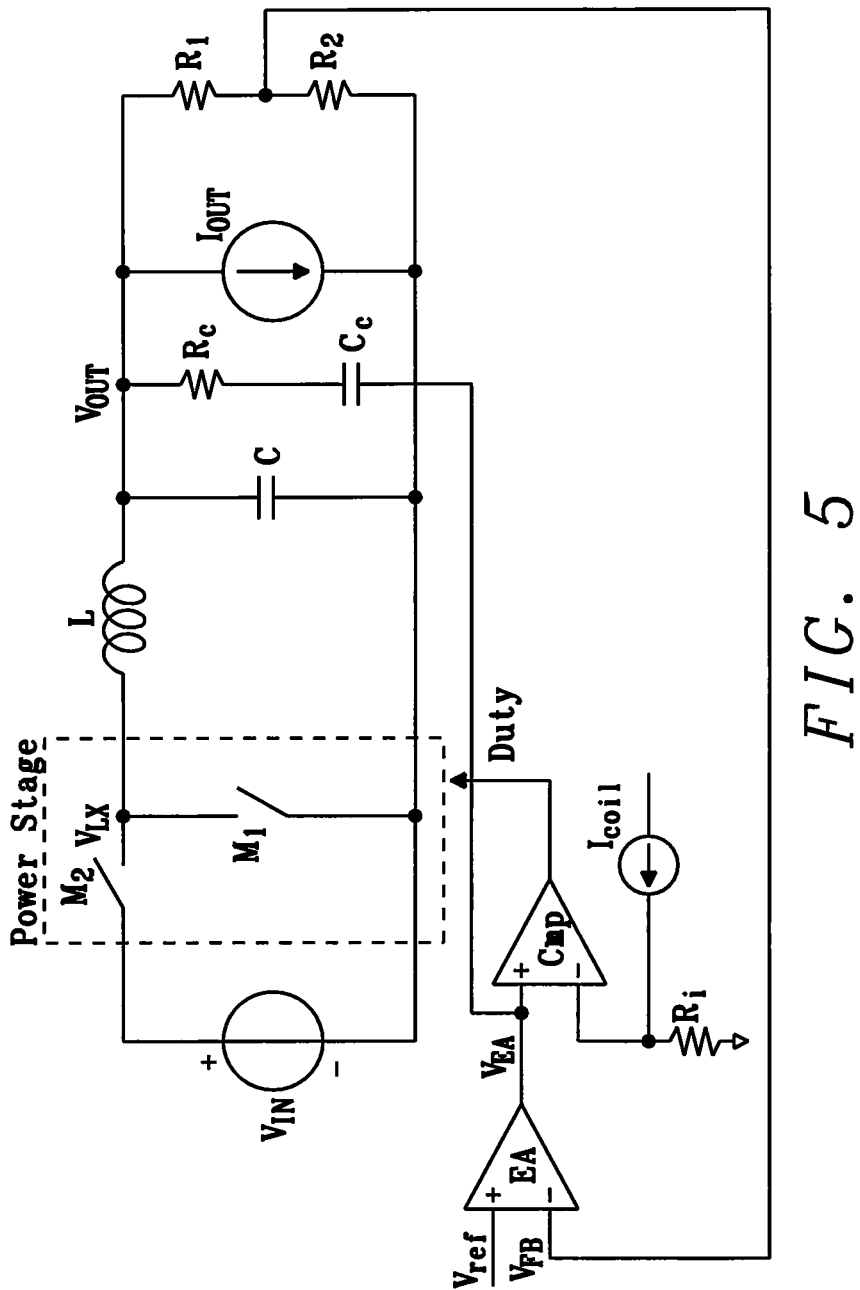
FIG. 5 shows an exemplary buck converter with a high-frequency path.

FIG. 4 shows an alternative power converter 4 comprising a high-frequency path 41 with an additional buffer circuit 42. The buffer circuit 42 may be implemented e.g. using a voltage follower configured to make the voltages on both sides of the voltage follower independent of each other. FIG. 5 shows an exemplary buck converter with a high-frequency path.

Step 2: The Gloop Transfer Function

Figure 6:
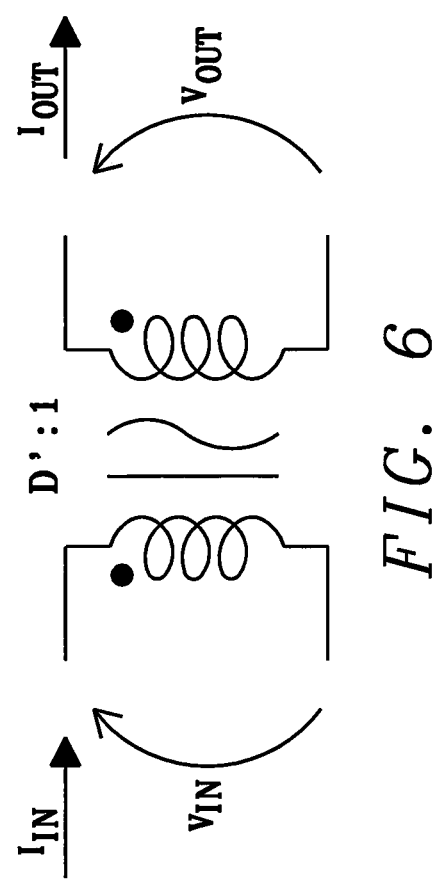
FIG. 6 shows an averaged power stage model.

To create a small signal model of the DC-DC converter, there is a need to handle the power stage that has a strong non-linear transfer function. To do this, first the non-linear waveforms are averaged over one switching period and then the circuit is linearized around the operating point. The result of the averaging is that the switching part can be modelled as a transformer with a 1/D' transform ratio that works also in DC (see FIG. 6). In fact, in a boost converter the relationship between Vin, Iin and Vout, Iout after the averaging is: Vout=Vin/D' and Iout=Iin*D'.

Looking at the disclosed circuit (see e.g. FIG. 1), the input for the power stage is the duty cycle signal. Following the signal flow, the power stage is entered with the duty cycle signal, and a coil current is generated. Then the current loop is closed on the coil current through Ri and the comparator Cmp, and this closed-loop current is sent on the output capacitor C.

Figure 7:
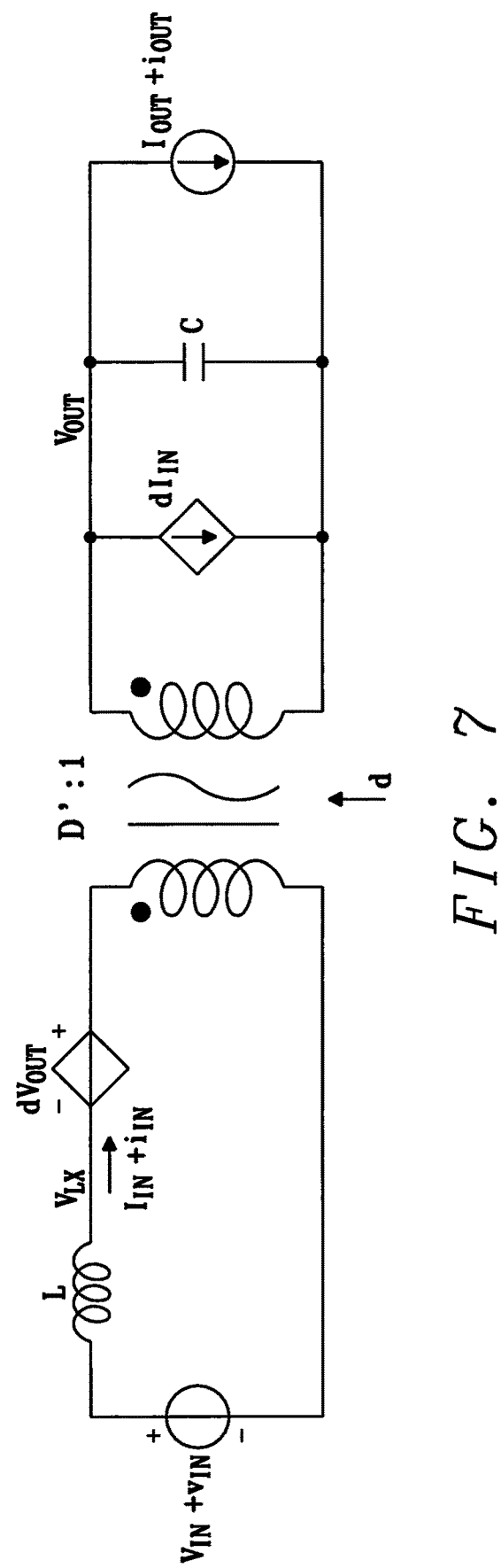
FIG. 7 shows an averaged and linearized power stage model.

First of all, there is interest in the transfer function from duty cycle signal to the coil current. If the two equations Vout=Vin/D' and Iout=Iin*D' are linearized, the response of the averaged power stage consists of two duty-cycle-dependent signal sources: one voltage source applied to the input with gain equal to Vout, and one current source applied to the output with gain equal to Iin (see FIG. 7).

Figure 8:
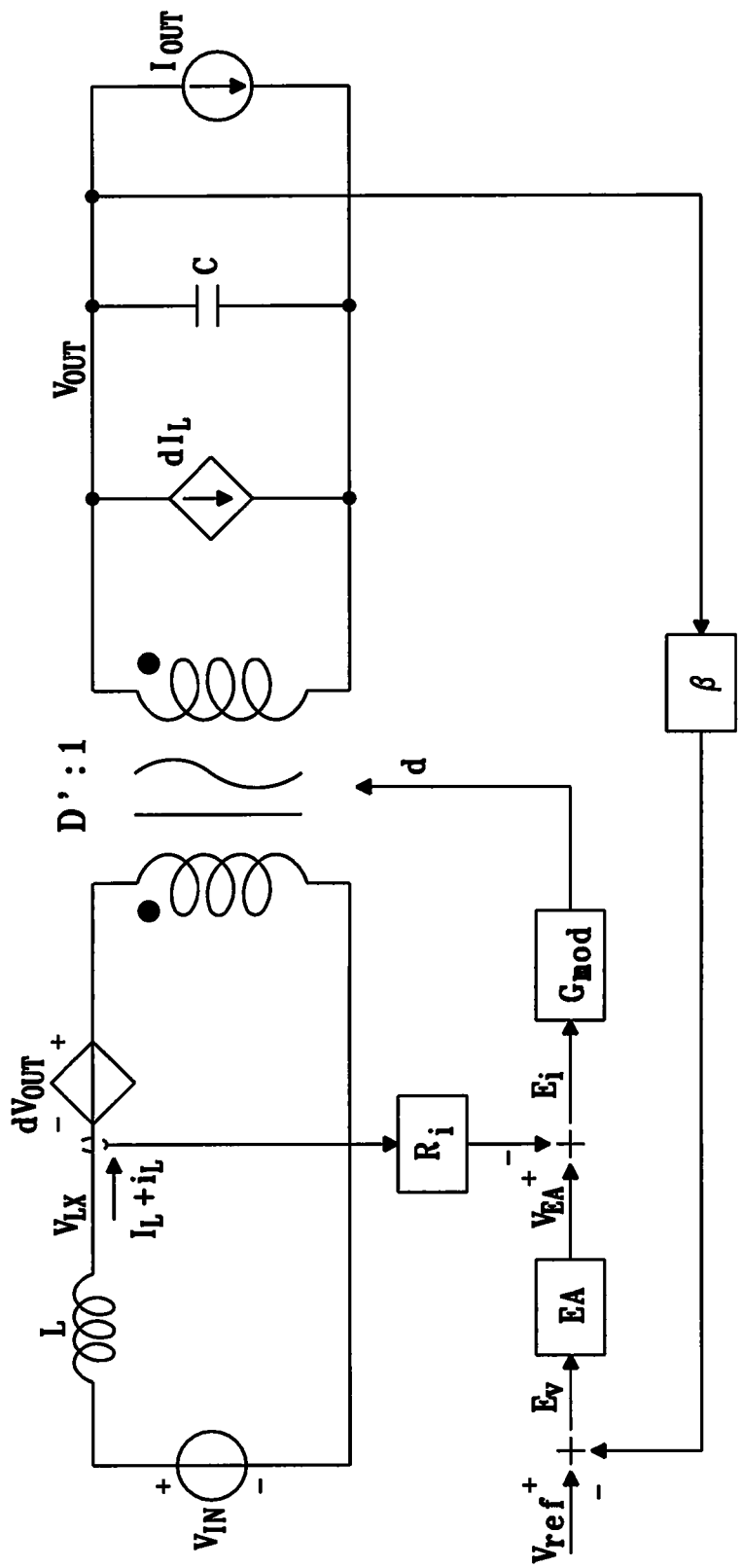
FIG. 8 shows a complete circuit diagram with the averaged and linearized power stage model.

It will be shown that the RHPZ comes from the fact that at the RHPZ frequency the current coming from the coil and sourced into the output capacitor C from the power stage is sinked by d*Iin. As a result, no signal is transferred to the output. With the linear circuit, the transfer function can be found from the small-signal duty cycle d to the coil current iin applying the usual analysis in the Laplace domain. This transfer function is called Gd,iin. First of all, the two sources Vin and Iout can be disabled, because they represent the bias point and are not seen in the small signal analysis. Then, the superimposition of the effects and d*Vout can be applied, disabling d*Iin and vice versa. The effect of d*Iin on the coil current is negligible here, and this current source will be considered only when the current flowing into the output capacitor C is calculated. When d*Vout is applied to find the coil current, the output capacitance C can be moved to the input of the transformer dividing it by D'^2, so that a voltage source is applied to the series of an inductor L and a capacitor C/D'^2. The generated current has a triangular shape in the Bode diagram, with a resonance at D'/sqrt(L*C). Given that a loop on the coil current is closed, the full circuit is then considered. Gmod (modulator gain) can be called the gain of the comparator that generates the small signal duty cycle d and beta the gain of the resistive divider R2/(R1+R2), as can be seen in FIG. 8.

Figure 9:
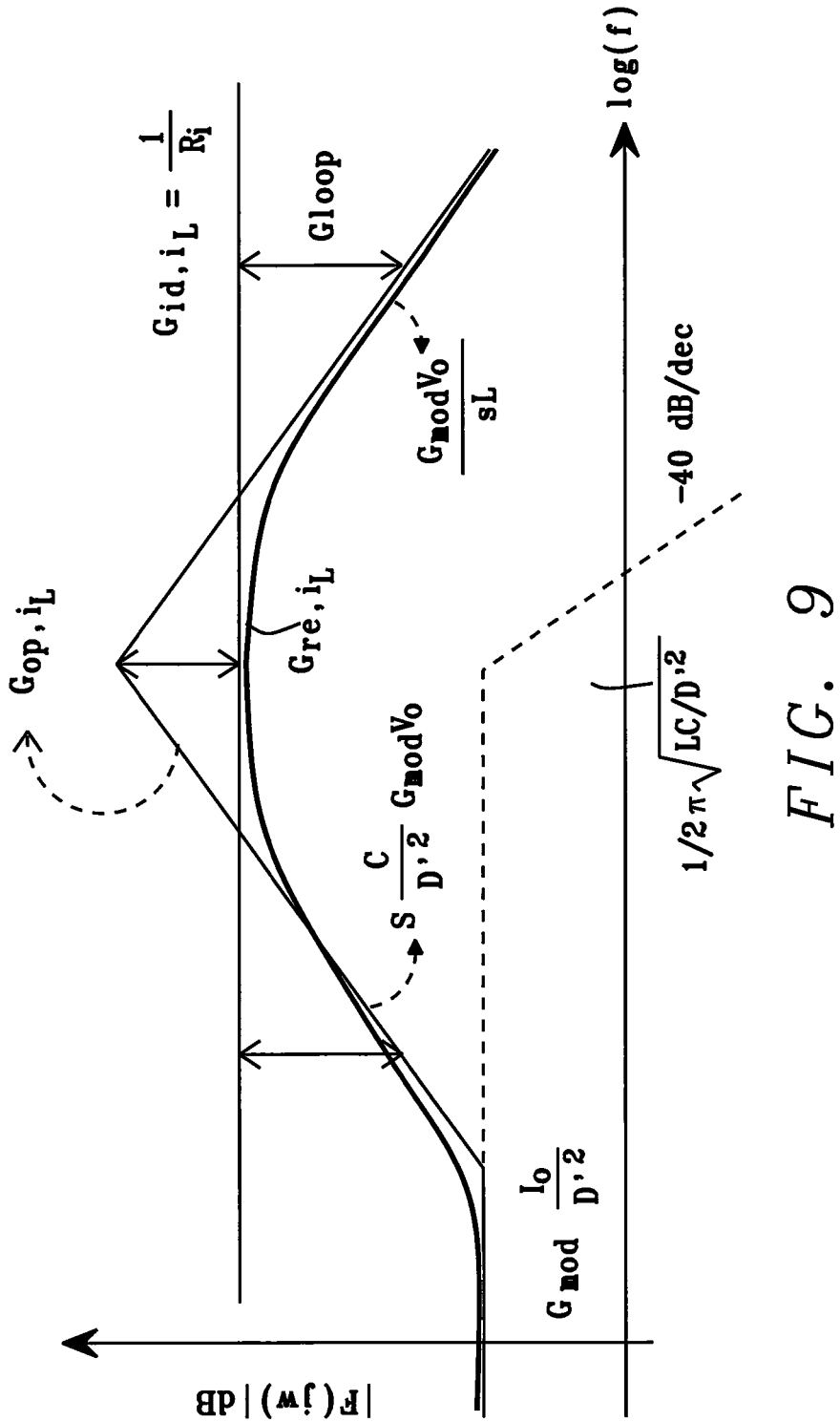
FIG. 9 shows a transfer function from the error amplifier output to the coil current with a closed current loop.

Focusing on the current loop, the loop is entered in from the output of the error amplifier $v_{ea}$, and multiplied by Gmod and by Gd,iin to find the forward gain. The loop is closed through Ri, so the feedback gain is Ri and the ideal gain, when the current loop gain is much greater than one, is 1/Ri. This gain is called Gid,il. This leads to the transfer function from $v_{ea}$ (the output of the error amplifier) to the coil current iin, called Gre,il. The triangular shape of Gd,iin is multiplied by Gmod (so it is simply shifted up or down) and then clamps to 1/Ri, when the current loop has a gain higher than one, leading to a trapezoidal shape (see FIG. 9). At low frequencies, there is the effect of the current source d*Iin on the coil current.

This current with a trapezoidal shape flows into the input of the transformer representing the averaged power stage and appears to its output simply multiplied by D' (so it is shifted down, but the shape is unaffected). At the output of the power stage, this current is sent into the output capacitor C.

Figure 10:
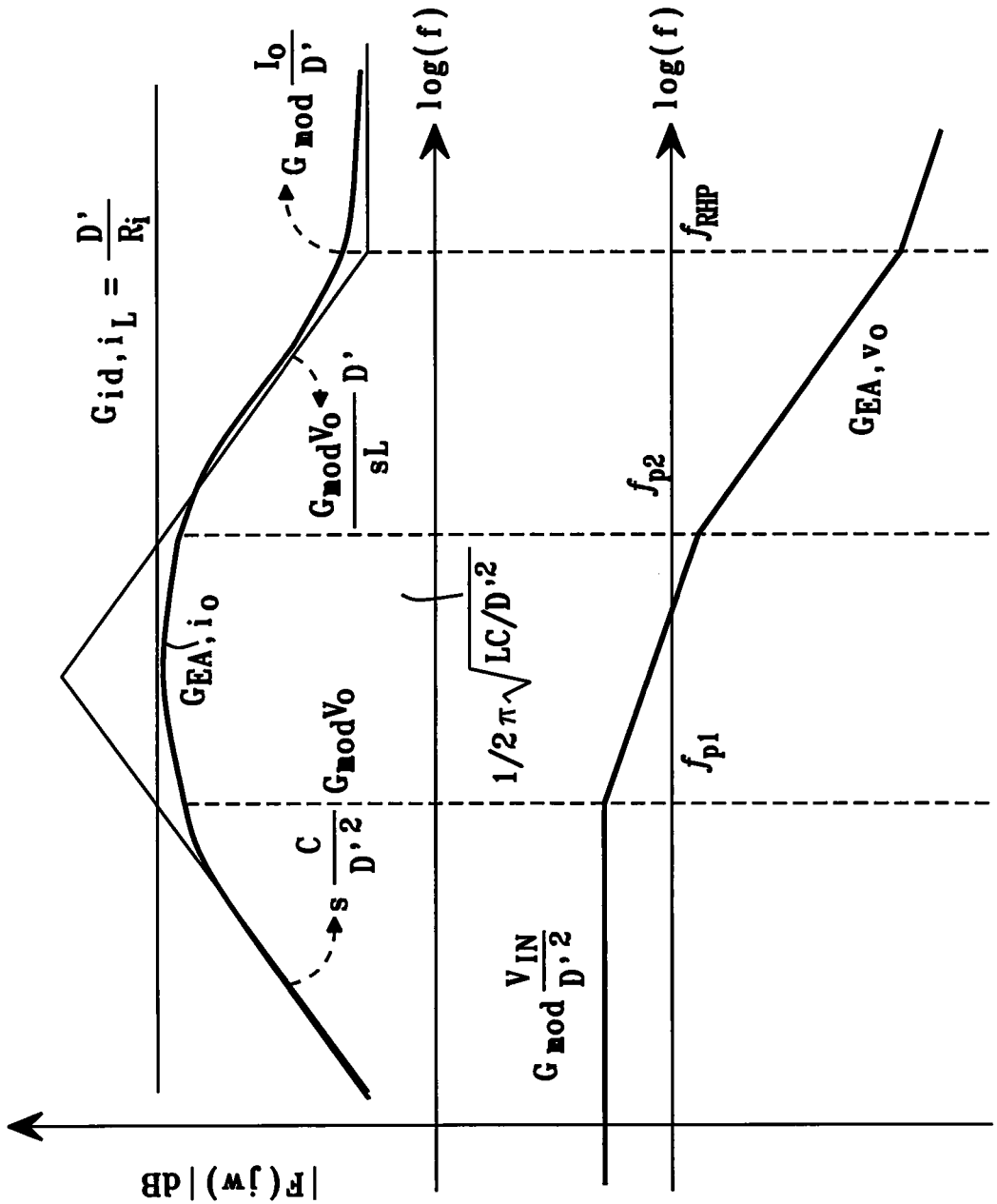
FIG. 10 shows a transfer function from the error amplifier output to the output capacitance current (Gea,io in the upper part) and to the output voltage (Gea,vo in the lower part)

Now consider the effect of the current source d*Iin on the output current. To obtain the current that flows into the output capacitor C, notice that the current source sees the coil looking into the power stage on one side and the output capacitor C on the other side, so at high frequencies this current flows entirely into the output capacitor, that is a low impedance, and below the resonance the gain has a −40 dB/dec slope. This current is then summed to the current coming from the coil described above, at the output of the power stage. After the sum, the effect of this current is visible only for high frequencies, where the current generated by the current source d*Iin and flowing into the output capacitor is higher than the closed-loop coil current, that tends to zero for high frequencies because the coil becomes a high impedance (see FIG. 10).

To find the output voltage, this current is sent into the output capacitor C, which results in a 90 degrees rotation. The transfer function is from error amplifier output to output voltage, and is called Gea,vo. To complete the Gloop, this same function is multiplied by the resistive divider ratio Beta, that is a shift down, and then by the error amplifier transfer function EA, that is designed to make the final Gloop stable and to shape it as per design requirements.

Figure 11:
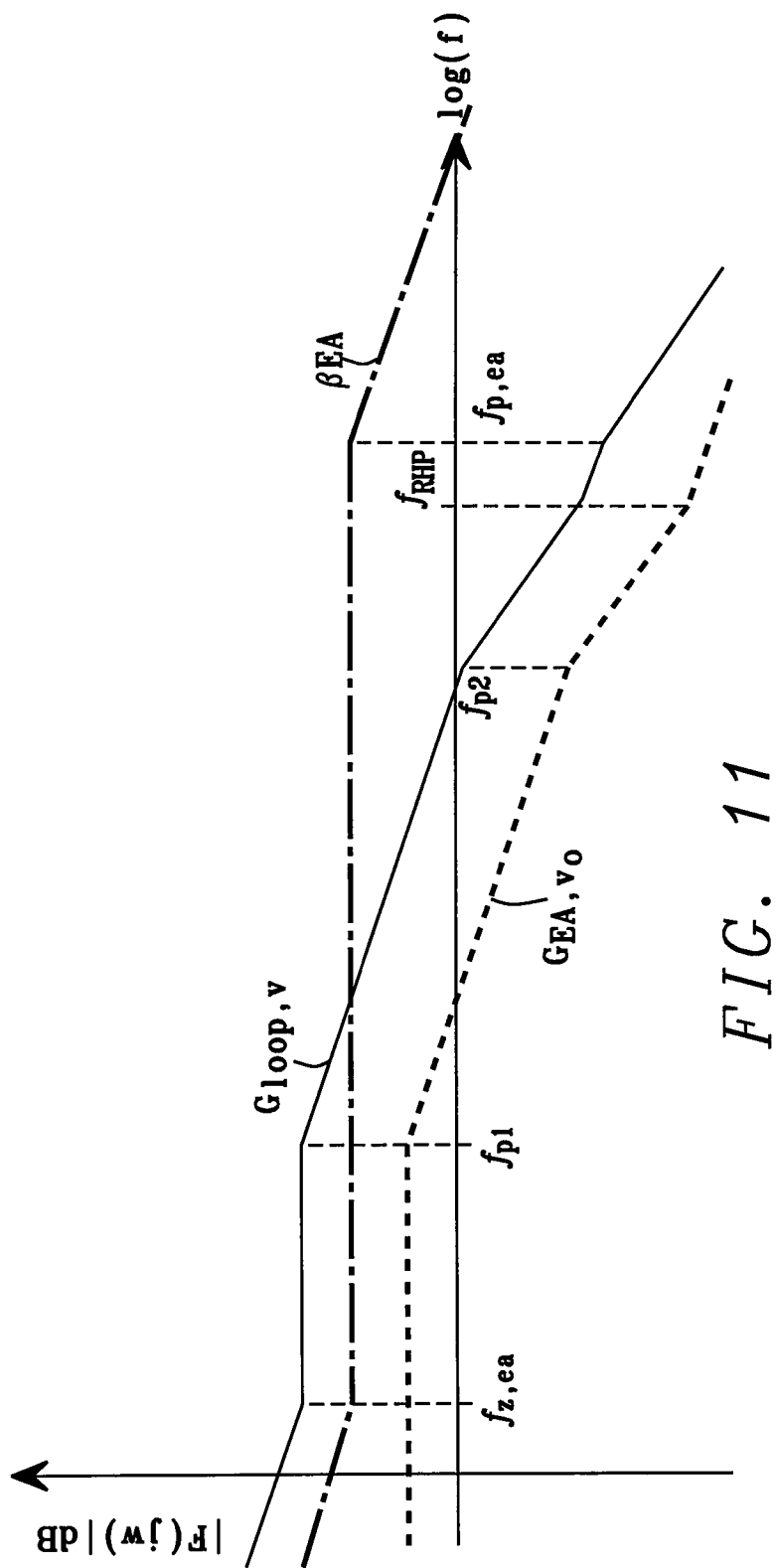
FIG. 11 shows a complete Gloop transfer function.

Summarizing, the complete Gloop transfer function (Gloop,v) is the multiplication of the Gea,vo transfer function by a function obtained by the multiplication of Beta times EA. In the Bode diagrams, the multiplication results in the sum of the functions, as can be seen in FIG. 11, where a type II compensation is considered (the EA has one zero and one pole), as an example.

Step 3: The RHPZ

With an insight into the complete Gloop transfer function, it can be seen that the RHPZ appears in the transfer function Gea,io from error amplifier output to the output current (see FIG. 10) as the result of the sum of the closed loop coil current generated by the voltage source d*Vout (the trapezoidal shape in the explanation above) with the current source d*Iin. Referring to FIG. 8, the current coming from the coil flows into the power stage and it is sourced into the output capacitance. The current d*Iin instead is sinked from the output capacitance. When the two currents are equal there is zero signal transferred to the output, resulting in a zero in the transfer function. Moreover, the minus in the expression of the zero comes from the fact the current d*Iin is subtracted from the coil current, creating the right half plane zero.

Step 4: Compensation of the RHPZ

It is now evident that if a current with gain equal to d*Iin is created and sourced into the output capacitance, the right half plane zero in the Gloop equation is cancelled out. Iin is the bias point of the coil current, but d is the small signal variation of the duty cycle signal D, and it is not straightforward to generate a signal proportional to d. To overcome this difficulty, notice that at the frequencies of the RHPZ, a region where the current loop is smaller than one exists, meaning that the current loop is open, and d is equal to vea*Gmod. The small signal variation of the duty cycle is obtained by the small signal variation of the error amplifier output multiplied by the modulator gain Gmod.

There is a way to cancel out the d*Iin current source. Starting from the error amplifier output, this current source becomes Gmod*Iin, so if a path is added from the error amplifier output to Vout and a current is generated with the same gain but opposite direction, the RHPZ is cancelled out. Given that in the Gea,io transfer function the current Gmod*Iin is seen only for frequencies higher than the RHPZ frequency, gain is needed in the new path only at these frequencies. The gain needs to go down for lower frequencies to avoid interfering with the main Gloop transfer function.

Given that if yea goes up, then the current Gmod*Iin is sinked from Vout, the new current needs to be sourced into Vout, with the same gain. For example, this can be achieved with a simple resistor Rc=1/Gmod*Iin with a capacitor Cc in series to add the high-pass shape to the transfer function (see FIG. 3). The Cc value must be chosen so that 1/(Rc*Cc) is lower than the RHPZ frequency and bigger than the first pole fp1 (see FIG. 10). To keep Cc small, 1/(Rc*Cc) can be set at the RHPZ frequency or slightly smaller. The RHPZ frequency is well known and it is equal to D'*Vin/(2π*L*Iout). If Rc is chosen such that the new current is smaller than Gmod*Iin, then the RHPZ is shifting to higher frequencies. If this current is bigger than Gmod*Iin, then the RHPZ becomes a left half plane zero (LHPZ) which improves the stability.

Summarizing, first Rc is chosen:

$$\begin{cases} R_c = 1/(G_{mod}I_{in}) \to & RHPZ \text{ is deleted} \\ R_c < 1/(G_{mod}I_{in}) \to & RHPZ \text{ becomes } LHPZ \\ R_c > 1/(G_{mod}I_{in}) \to & RHPZ \text{ is shifted to higher frequencies} \end{cases}$$

Thus, a resistance value of the resistive element of the second feedback path may be determined based on a gain of the comparator and an expected coil current Iin (under the expected working conditions). For example, a customer provides a supply voltage Vin=5V to a boost converter and wants to regulate Vout=10V. From the equation Vout=Vin/D', D' is found to be 0.5. Hence, looking at the LX node, a square wave is seen that is equal to Vout for 50% of the time and is 0 for the rest. If the customer connects to Vout a circuit that is using 1 A, this means that output current Iout of the boost converter is 1 A, so from the equation Iout=Iin*D', Iin is Iout/D'=1/0.5=2 A. In other words, the mean value of the current in the coil is 2 A. In the small signal analysis presented in this document, Iin refers to this fixed number.

Then Cc is chosen:

$$1/(R_cC_c) \le D'V_{in}/(LI_{out})$$

Depending on the use cases (value of coil, Vin, Vout and Iout) the resulting value for Cc can be too big to be integrated, so Cc would need to be an external component.

Also, in this discussion the new path is considered a monodirectional path. If the error amplifier has low output impedance, then the approximation is good. But if the error amplifier has high output impedance, a buffer is needed from the error amplifier output to the series of Rc with Cc, that would also help in decoupling the noise from vout to the error amplifier output. If a gain stage is used instead of a buffer, the values of Rc can be reduced, but the gain would be limited by the supply of the gain stage.

Depending on the use cases, the current through Rc and Cc can be significant (in the order of hundreds of milliamps root mean square RMS), so the buffer or the error amplifier need to have this current capability.

The new resistor Rc will add an extra power dissipation to the circuit, lowering the efficiency. However, the load transient performances are greatly improved, because if Vout drops due to a load increase, then the new path is a fast path that tries to recover it.

Figure 12:
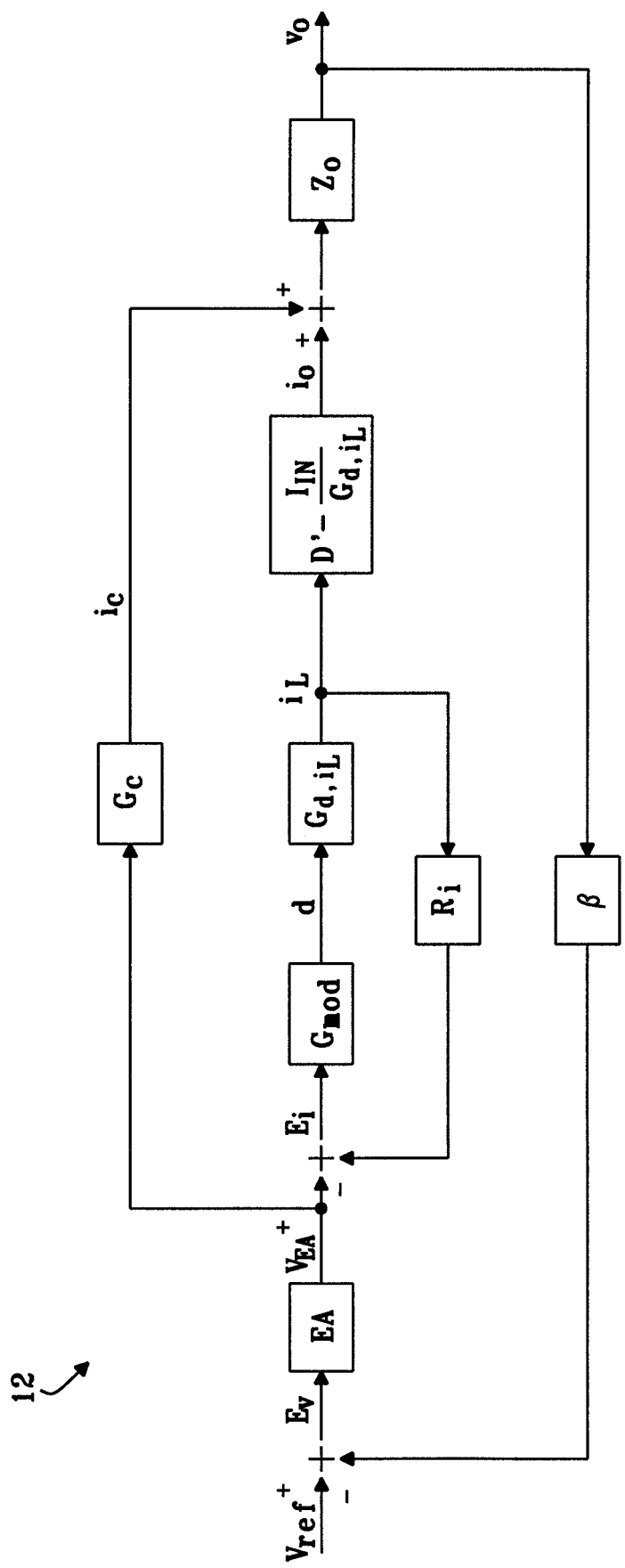
FIG. 12 shows block diagram representation of a boost converter with the new proposed path Gc added to the circuit.

In a block diagram of the circuit, the new path can be highlighted as Gc in FIG. 12. Starting from the output of the error amplifier yea, a current ic is generated that is summed on the output node to the power stage current. The high-frequency shape of this new path is not fundamental. A constant gain could be used, but this would interfere with the main loop for frequencies lower than the RHPZ frequency, complicating the design of the circuit. In the block diagram, Zo is the total output impedance connected to the output. Referring to the boost circuit proposed at the beginning (see FIG. 2), it is simply the output capacitance C.

To verify the result, a current mode boost converter is chosen with a type II compensation. The gain of the error amplifier is a simple constant in the frequencies of interest, with one zero at low frequencies to compensate for the integrative behavior and a high frequency pole to suppress the ripple. In this scenario, the Gloop has the same poles and zeros of the power stage transfer function Gea,io (gain from the output of the error amplifier to the output current of the DC-DC converter). There are two poles coming from the pole splitting and the RHPZ, as previously explained (see FIG. 10).

By increasing the gain of the error amplifier (EA), the Gloop transfer function is shifted up, and the unity gain frequency (UGF) goes near the second pole, so the phase margin decreases. If the EA is too high, the phase margin can be as small as zero due to the –90 degrees related to the second pole and can become negative due to the –90 degrees related to the RHPZ, resulting in an unstable system.

With the new proposed circuit, the RHPZ can be moved to higher frequencies or change it into a LHPZ. This LHPZ can compensate for the second pole. Given that there are no other zeros in the system that can compensate for the second pole, if the UGF of the new system is pushed to frequencies near or above the second pole, this means that it is true that the RHPZ is changed into a LHPZ that is compensating for the second pole, confirming the analysis.

Figure 13:
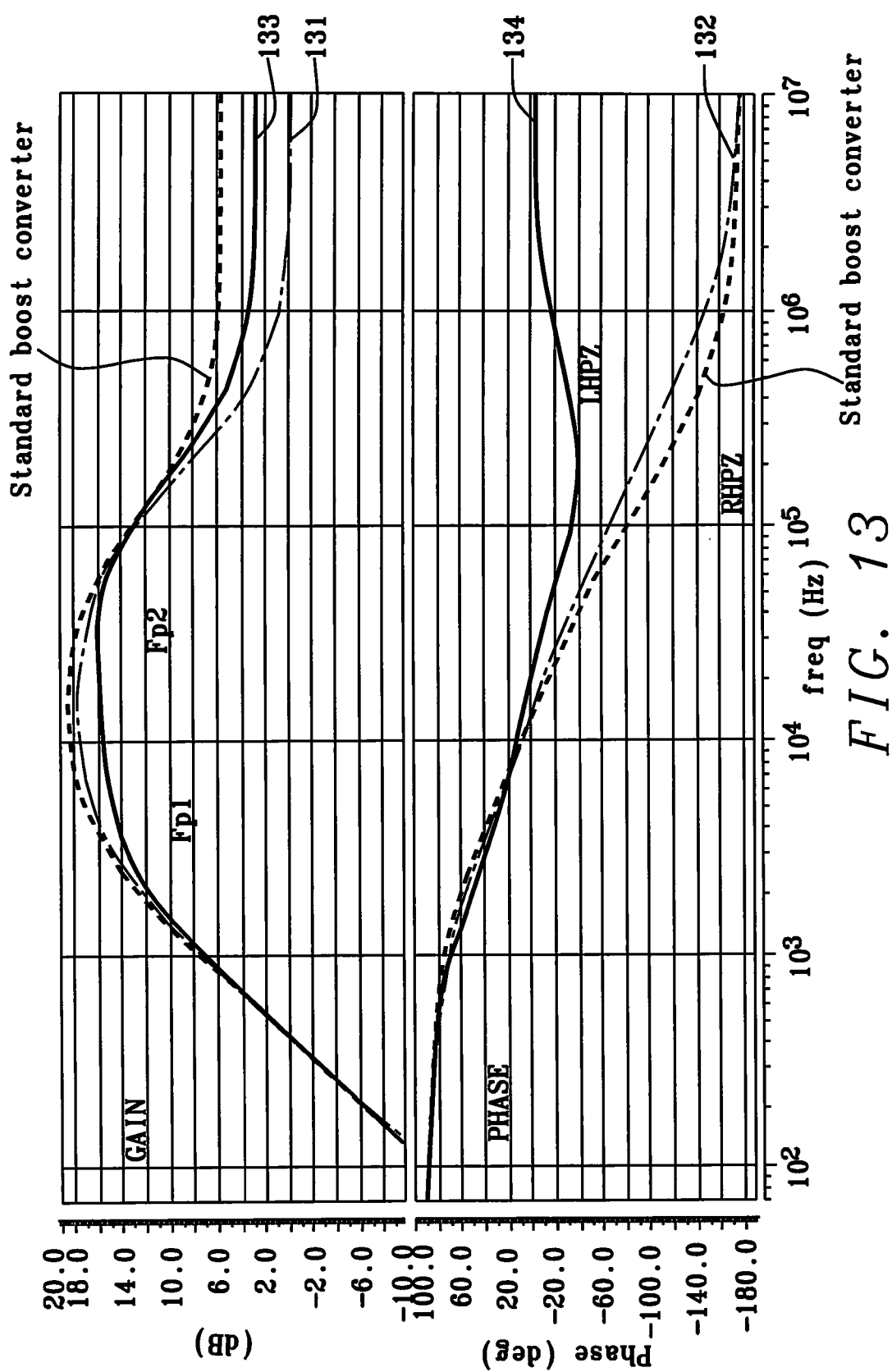
FIG. 13 shows a Gea,io transfer function from small signal model of a current mode boost converter.

First of all, an averaged small signal model is used, like the one described in the sections above, to plot the Gea,io transfer function (see FIG. 13). The transfer function of a standard boost converter (dashed line) is compared with the same transfer function of the same boost with the new parallel path from the error amplifier output to the output voltage. What is shown is how the RHPZ moves if the value of the new compensation resistor Rc changes. If Rc is chosen very big, the current that is generated is negligible with respect to the high frequency current Gmod*Iin generated by the power stage, and the new transfer function is superimposed with the transfer function of the standard boost converter. If the value of Rc is decreased, the RHPZ is moved to higher frequencies (see lines 131 and 132 in FIG. 13), because now a current is generated that starts to be comparable with Gmod*Iin, but it's still smaller. If Rc is decreased further, when 1/Rc is bigger than Gmod*Iin, then the RHPZ becomes a LHPZ, and the phase of the transfer function goes up 90 degrees at the frequency of the zero, instead of down as it does when the zero is in the right half plane (see lines 133 and 134 in FIG. 13).

Now for the new proposed circuit, Rc is chosen such that the RHPZ becomes LHPZ and goes near the second pole, compensating for it, and the response of the switching converter to a load transient (a step in the output current) with respect to a standard boost in the same conditions is shown.

Figure 14:
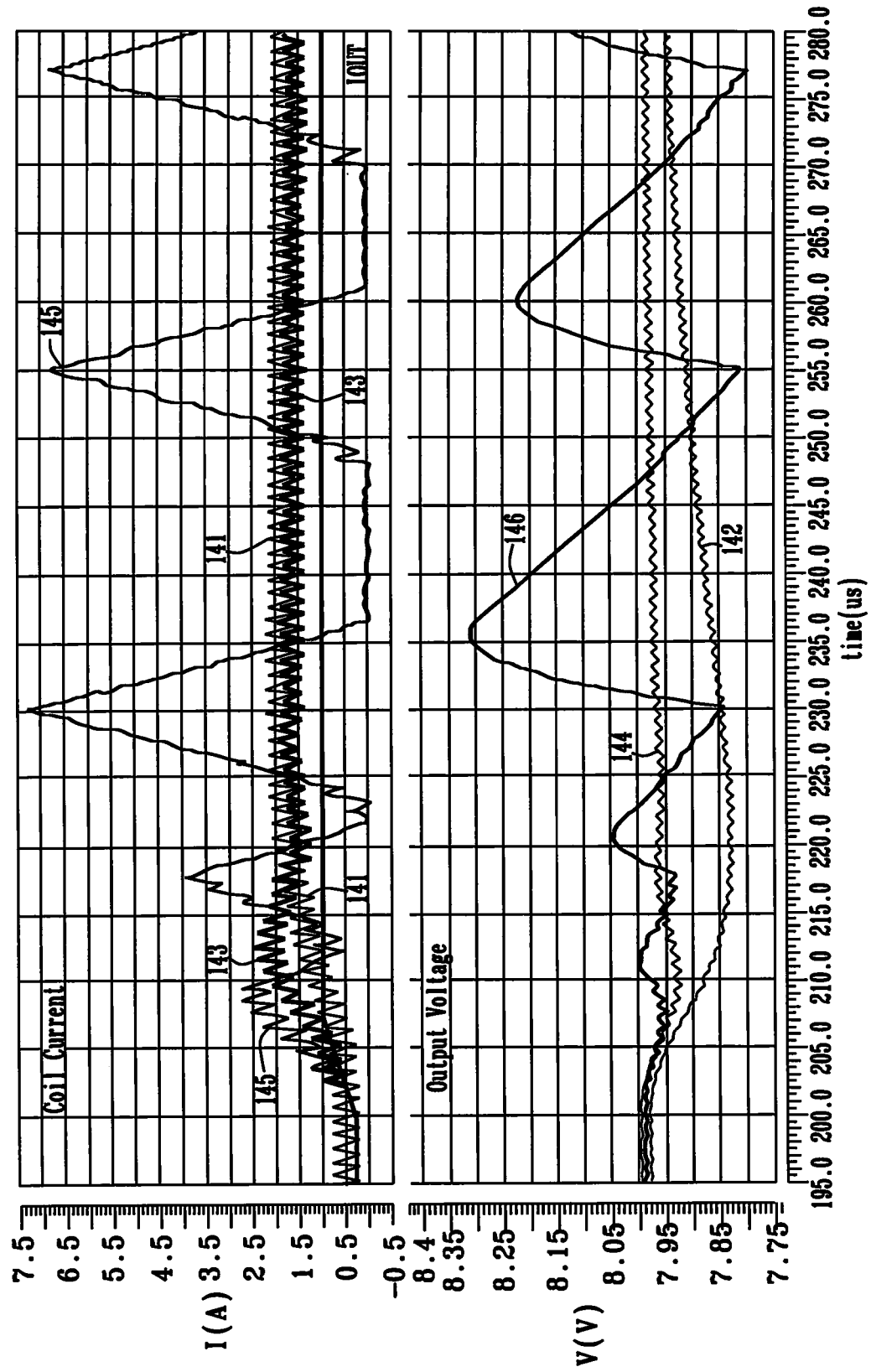
FIG. 14 shows standard boost load transient waveforms with three different error amplifier gains (stable system, poor phase margin and unstable system)

Starting from the standard boost power converter, three EA gains are chosen. The first is chosen low enough to have a stable converter, with the UGF of the Gloop much lower than the second pole and the RHPZ. The AC model gives a phase margin of 67 degrees. Then the EA gain is increased to a level where the AC model gives a poor phase margin, and finally an EA gain is chosen high enough to have negative phase margin (unstable system). The transient waveforms are shown in FIG. 14.

Figure 15:
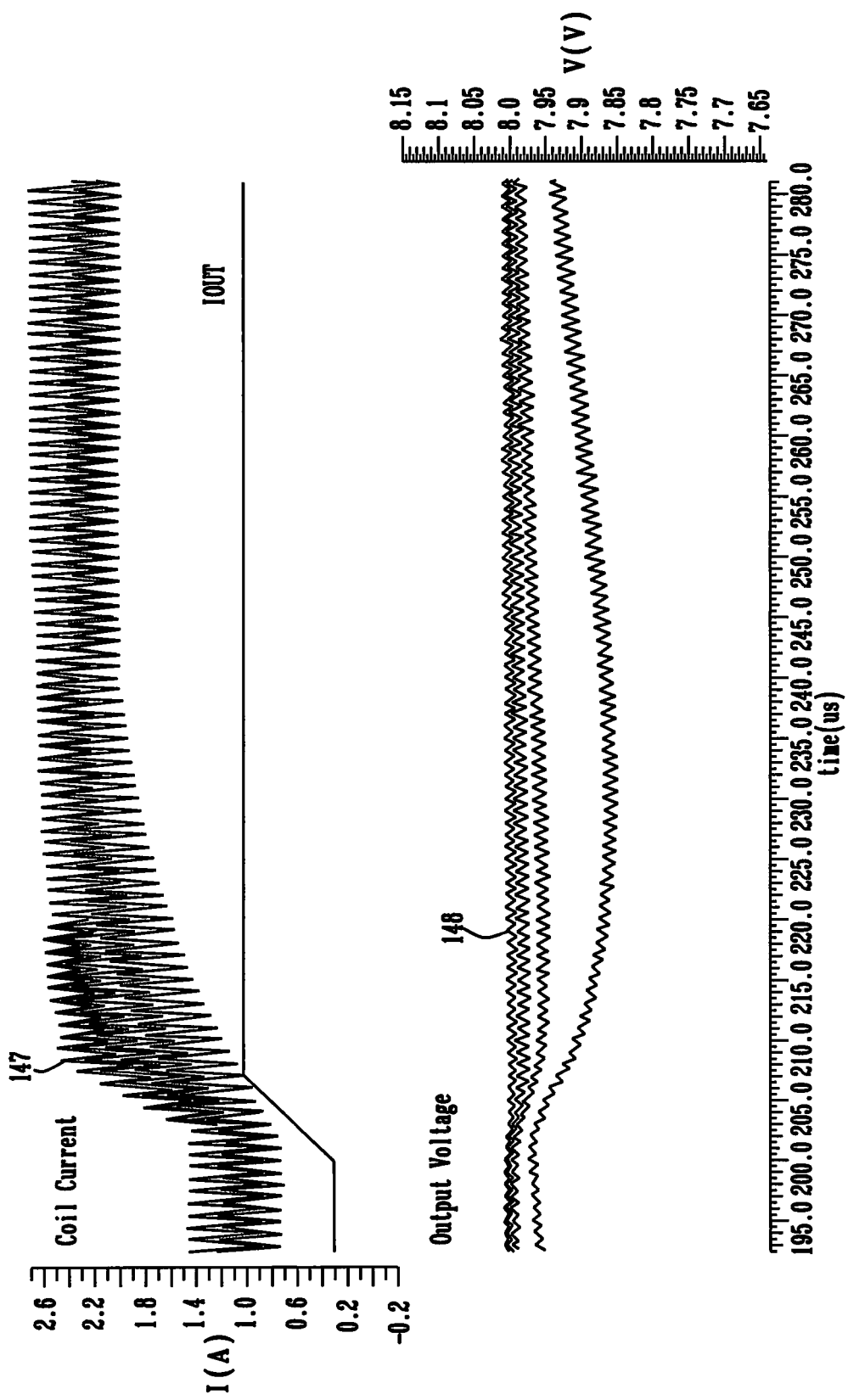
FIG. 15 shows load transients with the new compensation scheme and increasing error amplifier gains.

When the system is stable, there is no overshoot in both voltage and current (low EA gain, lines 141 and 142). With higher gain the UGF is bigger and the system is faster, but undershoots and overshoots are seen in the waveforms due to a poor phase margin (medium EA gain, lines 143 and 144). The AC model gives a phase margin of 27 degrees in this condition. Finally, with an error amplifier EA gain too high, there is negative phase margin from the AC model, and the transient waveforms show an unstable response (high EA gain, lines 145 and 146). Doing exactly the same exercise with the new proposed compensation scheme, with a Rc small enough to change the RHPZ into a LHPZ near the second pole, it can be seen that the system is still stable also for the high EA gain case (see FIG. 15).

The three EA gains are the same as the standard boost converter, but it can be seen that the system is still stable with good phase margin (no overshoots and undershoots in the waveforms). From the AC model under these conditions, there is a phase margin of 87, 78 and 56 degrees for the three increasing EA gains. With this configuration, the EA gain can be pushed even higher, with the AC model giving a phase margin of 47 degrees. The system is now fast enough to follow the increasing output load and the output voltage has almost no undershoot during the load transient (lines 147 and 148).

Figure 16:
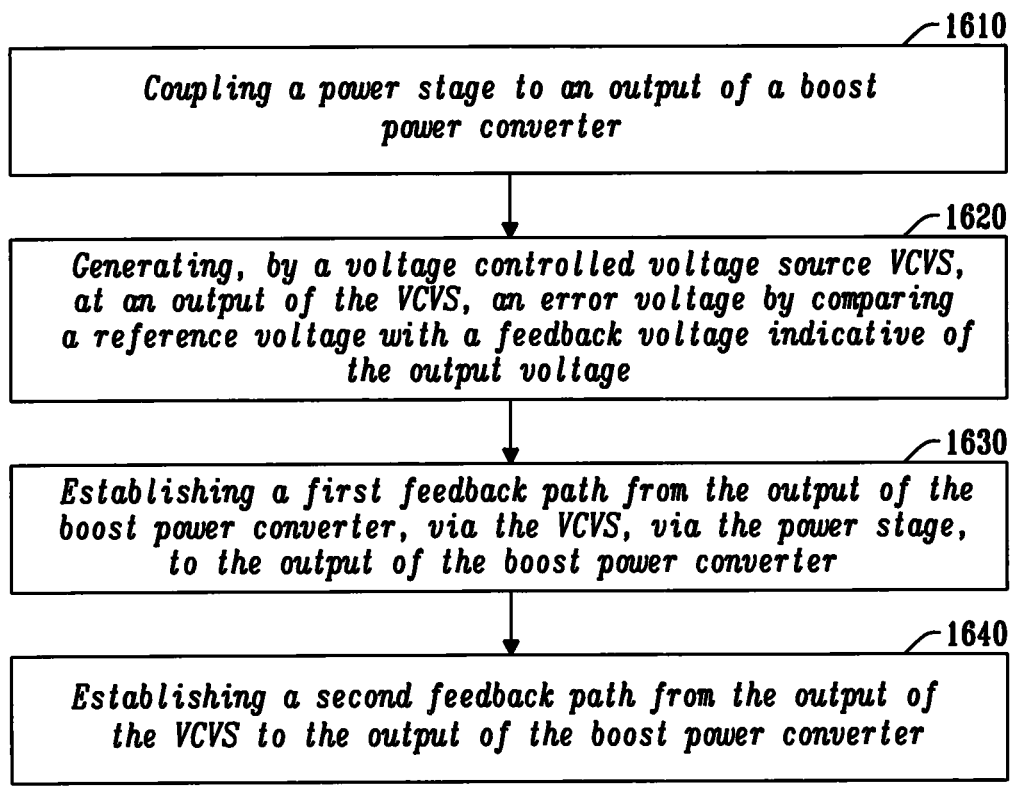
FIG. 16 shows a flowchart for a method of Right Half Plane Zero Compensation in a boost power converter.

FIG. 16 shows a flowchart for a method of Right Half Plane Zero Compensation in a boost power converter. The method comprises the step 1610, coupling a power stage to the output of the boost power converter. The method comprises the step 1620, generating, by a voltage controlled voltage source VCVS, at an output of the VCVS, an error voltage by comparing a reference voltage with a feedback voltage indicative of the output voltage. The method also comprises the step 1630, establishing a first feedback path from the output of the boost power converter, via the VCVS, via the power stage, to the output of the boost power converter. The method also comprises the step 1640, establishing a second feedback path from the output of the VCVS to the output of the boost power converter.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A boost power converter configured to convert an input voltage at an input of the boost power converter into an output voltage at an output of the boost power converter, the boost power converter comprising:
   a power stage coupled to the output of the boost power converter,
   a voltage controlled voltage source (VCVS) configured to generate, at an output of the VCVS, an error voltage by comparing a reference voltage with a feedback voltage indicative of the output voltage,
   a first feedback path from the output of the boost power converter, via the VCVS, via the power stage, to the output of the boost power converter, and
   a second feedback path from the output of the VCVS to the output of the boost power converter,
   wherein the second feedback path does not comprise the power stage.

2. The boost power converter according to claim 1, wherein the second feedback path comprises a high pass filter.

3. The boost power converter according to claim 1, wherein the second feedback path comprises a resistive element and a capacitive element.

4. The boost power converter according to claim 3, wherein the second feedback path comprises a buffer circuit coupled in series with the resistive element and the capacitive element.

5. The boost power converter according to claim 1, wherein the VCVS comprises an error amplifier.

6. The boost power converter according to claim 1, wherein the VCVS comprises
   a voltage controlled current source (VCCS) configured to generate an error current by comparing the feedback voltage with the reference voltage, and
   a first resistor configured to translate the error current into said error voltage,
wherein the second feedback path comprises a single resistive element coupled to said error current.

7. The boost power converter according to claim 1, further comprising:
   an inductive element coupled between the input of the boost power converter and the power stage, and
   a comparator configured to generate a duty cycle signal by comparing the error voltage with a voltage indicative of a current through the inductive element.

8. The boost power converter according to claim 7, further comprising a current sensing circuit configured to sense a current through the inductive element.

9. The boost power converter according to claim 8, further comprising:
   a third feedback path from the current sensing circuit, via the comparator, via the power stage, to the output of the boost power converter.

10. The boost power converter according to claim 1, wherein the power stage further comprises:
    a high-side switching element coupled between a switching node of the power stage and the output of the boost power converter,
    a low-side switching element coupled between the switching node and a reference potential.

11. A buck power converter configured to convert an input voltage at an input of the buck power converter into an output voltage at an output of the buck power converter, the buck power converter comprising:
    a power stage coupled to the input of the buck power converter,
    a voltage controlled voltage source (VCVS) configured to generate, at an output of the VCVS, an error voltage by comparing a reference voltage with a feedback voltage indicative of the output voltage,
    a first feedback path from the output of the buck power converter, via the VCVS, via the power stage, to the output of the buck power converter, and
    a second feedback path from the output of the VCVS to the output of the buck power converter,
    wherein the second feedback path does not comprise the power stage.

12. The buck power converter according to claim 11, wherein the second feedback path comprises a high pass filter.

13. The buck power converter according to claim 11, wherein the VCVS comprises
    a voltage controlled current source (VCCS) configured to generate an error current by comparing the feedback voltage with the reference voltage, and
    a first resistor configured to translate the error current into said error voltage,
wherein the second feedback path comprises a single resistive element coupled to said error current.

14. The buck power converter according to claim 11, further comprising:
    an inductive element coupled between the power stage and the output of the buck power converter, and
    a comparator configured to generate a duty cycle signal by comparing the error voltage with a voltage indicative of a current through the inductive element.

15. The buck power converter according to claim 11, wherein the power stage further comprises:
    a high-side switching element coupled between a switching node of the power stage and the input of the buck power converter, and
    a low-side switching element coupled between the switching node and a reference potential.

16. A method of operating a boost power converter, wherein the boost power converter converts an input voltage at an input of the boost power converter into an output voltage at an output of the boost power converter, the method comprising:
    coupling a power stage to the output of the boost power converter,
    generating, by a voltage controlled voltage source (VCVS), at an output of the VCVS, an error voltage by comparing a reference voltage with a feedback voltage indicative of the output voltage,
    establishing a first feedback path from the output of the boost power converter, via the VCVS, via the power stage, to the output of the boost power converter, and
    establishing a second feedback path from the output of the VCVS to the output of the boost power converter, wherein the second feedback path does not comprise the power stage.

17. The method according to claim 16, wherein the second feedback path comprises a high pass filter.

18. The method according to claim 16, wherein the second feedback path comprises a resistive element and a capacitive element.

19. The method according to claim 18, wherein the second feedback path comprises a buffer circuit coupled in series with the resistive element and the capacitive element.

20. The method according to claim 16, wherein the VCVS comprises an error amplifier.

21. The method according to claim 16, wherein the VCVS comprises a voltage controlled current source (VCCS) and a first resistor, and the method comprises:
    generating, by the VCCS, an error current by comparing the feedback voltage with the reference voltage, and
    translating, by the first resistor, the error current into said error voltage,
wherein the second feedback path comprises a single resistive element coupled to said error current.

22. The method according to claim 16, further comprising:
    coupling an inductive element between the input of the boost power converter and the power stage, and
    generating, by a comparator, a duty cycle signal by comparing the error voltage with a voltage indicative of a current through the inductive element.

23. The method according to claim 22, further comprising sensing, by a current sensing circuit, a current through the inductive element.

24. The method according to claim 23, further comprising:
    establishing a third feedback path from the current sensing circuit, via the comparator, via the power stage, to the output of the boost power converter.

25. The method according to claim 16, further comprising, within the power stage:
    coupling a high-side switching element between a switching node of the power stage and the output of the boost power converter,
    coupling a low-side switching element between the switching node and a reference potential.

26. A method of operating a buck power converter, wherein the buck power converter converts an input voltage at an input of the buck power converter into an output voltage at an output of the buck power converter, wherein the method comprises:
    coupling a power stage to the input of the buck power converter,
    generating, by a voltage controlled voltage source (VCVS), at an output of the VCVS, an error voltage by comparing a reference voltage with a feedback voltage indicative of the output voltage,
    establishing, a first feedback path from the output of the buck power converter, via the VCVS, via the power stage, to the output of the buck power converter, and
    establishing, a second feedback path from the output of the VCVS to the output of the buck power converter,
wherein the second feedback path does not comprise the power stage.

27. The method according to claim 26, wherein the second feedback path comprises a high pass filter.

28. The method according to claim 26, further comprising
    generating, by a voltage controlled current source (VCCS), an error current by comparing the feedback voltage with the reference voltage, and
    translating, by a first resistor, the error current into said error voltage, and
    coupling a single resistive element of the second feedback path to said error current.

29. The method according to claim 26, further comprising:
    coupling an inductive element between the power stage and the output of the buck power converter, and
    generating, by a comparator, a duty cycle signal by comparing the error voltage with a voltage indicative of a current through the inductive element.

30. The method according to claim 26, wherein the method further comprises:
    coupling a high-side switching element between a switching node of the power stage and the input of the buck power converter, and
    coupling a low-side switching element between the switching node and a reference potential.

* * * * *